United States Patent
Hansma et al.

(10) Patent No.: US 8,688,756 B2
(45) Date of Patent: *Apr. 1, 2014

(54) SYSTEM, METHOD AND COMPUTER PROGRAM PRODUCT FOR STORING FILE SYSTEM CONTENT IN A MULTI-TENANT ON-DEMAND DATABASE SYSTEM

(71) Applicant: salesforce.com, inc, San Francisco, CA (US)

(72) Inventors: Scott Hansma, San Francisco, CA (US); Simon Z. Fell, San Francisco, CA (US); Ryan Brainard, San Francisco, CA (US); Sridevi G. Krishnan, San Francisco, CA (US); Deepa Gupta, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,131

(22) Filed: Apr. 29, 2013

(65) Prior Publication Data

US 2013/0246373 A1    Sep. 19, 2013

Related U.S. Application Data

(63) Continuation of application No. 12/965,755, filed on Dec. 10, 2010, now Pat. No. 8,463,828.

(60) Provisional application No. 61/307,798, filed on Feb. 24, 2010, provisional application No. 61/307,800, filed on Feb. 24, 2010.

(51) Int. Cl.
*G06F 17/30*    (2006.01)

(52) U.S. Cl.
USPC .................. 707/825; 707/695; 707/E17.01

(58) Field of Classification Search
None
See application file for complete search history.

(56) References Cited

U.S. PATENT DOCUMENTS

| | | | |
|---|---|---|---|
| 6,253,214 B1 * | 6/2001 | Hall et al. ............... | 707/667 |
| 6,330,572 B1 * | 12/2001 | Sitka .................... | 707/608 |
| 2006/0095470 A1 * | 5/2006 | Cochran et al. .......... | 707/104.1 |
| 2007/0011718 A1 * | 1/2007 | Nee, Jr. ................. | 725/135 |
| 2009/0013011 A1 * | 1/2009 | Barker et al. ........... | 707/203 |
| 2011/0125712 A1 * | 5/2011 | Kaila et al. ............ | 707/626 |

* cited by examiner

*Primary Examiner* — Anteneh Girma
(74) *Attorney, Agent, or Firm* — Zilka-Kotab, PC

(57) ABSTRACT

In accordance with embodiments, there are provided mechanisms and methods for storing file system content in a multi-tenant on-demand database system. These mechanisms and methods for storing file system content in a multi-tenant on-demand database system can enable embodiments to reduce a number of files stored on a file system, avoid copying of all file system content to file system copies, etc.

8 Claims, 10 Drawing Sheets

SYSTEM, METHOD AND COMPUTER PROGRAM PRODUCT FOR STORING FILE SYSTEM CONTENT IN A MULTI-TENANT ON-DEMAND DATABASE SYSTEM

CLAIM OF PRIORITY

This application is a continuation of U.S. application Ser. No. 12/965,755, filed Dec. 10, 2010, which claims the benefit of U.S. Provisional Patent Application No. 61/307,798, filed Feb. 24, 2010, and U.S. Provisional Patent Application No. 61/307,800, filed Feb. 24, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to storing content, and more particularly to storing content in a file system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional file systems, content is stored for providing access thereto by users, applications, etc. In particular, files are generally stored by the file systems for being retrieved, written to, etc. Unfortunately, conventional file systems have been associated with various limitations.

For example, such files systems have generally performed poorly with respect to storing a large number of different files, but have nonetheless allowed storage of content regardless of its size. As another example, when a copy of the file system is created for any purpose, all of the content stored in the file system is required to be copied over to file system copy, which is time consuming and many times resource intensive. Accordingly, it is desirable to provide techniques reducing a number of files stored on a file system, avoiding copying of all file system content to file system copies, etc.

BRIEF SUMMARY

In accordance with embodiments, there are provided mechanisms and methods for storing file system content in a multi-tenant on-demand database system. These mechanisms and methods for storing file system content in a multi-tenant on-demand database system can enable embodiments to reduce a number of files stored on a file system, avoid copying of all file system content to file system copies, etc.

In an embodiment and by way of example, a method for storing file system content in a multi-tenant on-demand database system is provided. In one embodiment, a plurality of files located on a multi-tenant on-demand database system is identified, where each file is below a threshold size. Additionally, the files are concatenated to create a single concatenated file. Further, the single concatenated file is stored in a file system of the multi-tenant on-demand database system. In another embodiment, content stored in a file system of a first device of a multi-tenant on-demand database system is identified. Moreover, a reference to the content is stored on a second device of the multi-tenant on-demand database system for maintaining on the second device a copy of at least a portion of memory of the first device.

While one or more implementations and techniques are described with reference to an embodiment in which storing file system content in a multi-tenant on-demand database system is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for storing file system content a multi-tenant on-demand database system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for storing file system content in a multi-tenant on-demand database system will be described with reference to example embodiments.

Figure 1:
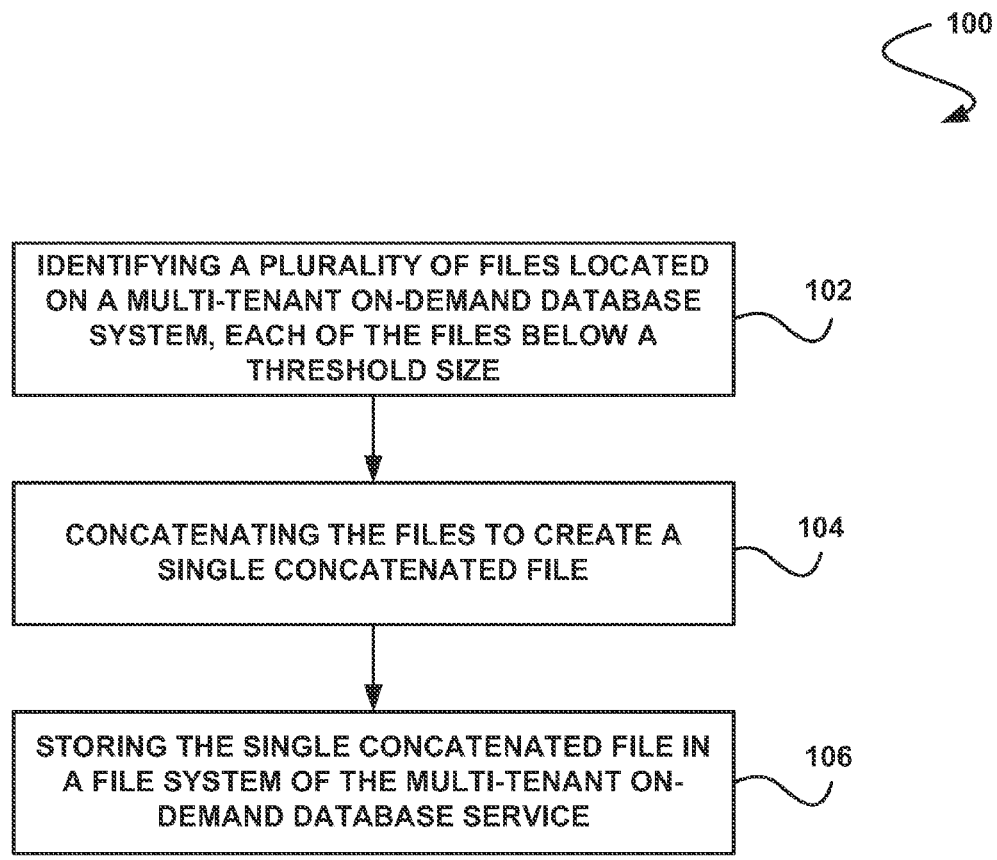
FIG. 1 illustrates a method for concatenating files in a multi-tenant on-demand database system, in accordance with one embodiment.

FIG. 1 illustrates a method 100 for concatenating files in a multi-tenant on-demand database system, in accordance with one embodiments. As shown in operation 102, a plurality of files located on a multi-tenant on-demand database system is identified, where each file is below a threshold size. With respect to the present description, the files may each include any data structure storing data, where the data structure is below the threshold size. For example, the files may each include a text file, an image file, a video file, etc.

Further, in various embodiments, the files may be stored in a file system of the multi-tenant on-demand database system, a database of the multi-tenant on-demand database system (e.g. separate from the file system), or any other location (or combination of locations) of the multi-tenant on-demand database system. With respect to the present embodiment, such file system includes a system of a multi-tenant on-demand database system that is utilized for storing files (e.g. and which is separate from a database of the multi-tenant on-demand database system). Just by way of example, in response to a request to store each of the files in the file system, a size of the file may be determined such that if the file is above (or equal to) the threshold size, the file may be stored in the file system, whereas if the file is below the threshold size, the file may be stored in the database. To this end, the files may be identified from the database, the file system, etc. or any combination thereof.

Optionally, the files may be identified in response to a determination that each of such files is below the threshold size. Thus, only files below the threshold size may be identified. It should be noted that the threshold size may be preconfigured in any desired manner (e.g. by a user, etc.).

It should be noted that, as described above, such multi-tenant on-demand database service may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

Additionally, as shown in operation 104, the files are concatenated to create a single concatenated file. With respect to the present description, concatenating the files may include aggregating the files in any manner that results in the single concatenated file. Thus, the files that are each of less than the threshold size may be concatenated to form a single concatenated file that is larger in size than each of the files individually.

In one embodiment, the files may be concatenated into the single concatenated file according to a predetermined format. For example, the single concatenated file may store data including each of the files, and for each of the files an indicator of a length of the file and a checksum of the file. As another example, the single concatenated file may store a checksum of all of the aforementioned data stored in the single concatenated file. It should be noted that by including the aforementioned checksum(s), the files included in the single concatenated file and/or the single concatenated file itself may be validated. Of course, however, the single concatenated file may only include the files appended to one another, or may include any other predetermined format.

Table 1 illustrates one example of the predetermined format which may be utilized for concatenating the files into the single concatenated file. Of course, it should be noted that the predetermined format shown in Table 1 is set forth for illustrative purposes only, and thus should not be construed as limiting in any manner.

TABLE 1

[checksum of single concatenated file] [length of first file][checksum of first file] [first file] [length of second file] [checksum of second file] [second file]...[length of nth file][checksum of nth file] [nth file]

Further, as shown in operation 106, the single concatenated file is stored in a file system of the multi-tenant on-demand database system. Such file system may include the file system described above from which the files below the threshold size may be identified. With respect to the present description, storing the single concatenated file in the file system may include writing such single concatenated file to the file system.

Optionally, in response to the storage of the single concatenated file in the file system, the files (identified in operation 102) may be deleted and a pointer to each of the files may be stored. The pointer stored for a file may point to the single concatenated file, in one embodiment. In another embodiment, the pointer stored for a particular file may point to an offset (e.g. byte offset) in the single concatenated file associated with the file. For example, the offset may include a beginning of the file in the single concatenated file, a checksum of the file in the single concatenated file, etc. By storing such pointers, a particular file included in the single concatenated file may be directly accessed (e.g. without necessarily reading the entire single concatenated file or a portion of the single concatenated file that is larger than the file to be accessed).

As a further option, the pointers may be stored in a database separate from the file system. For example, such database may include the aforementioned database from which the files may be identified (in operation 102). In this way, the file system may optionally avoid storing a plurality of files each below a threshold size, and instead may store a single concatenated file of a larger size which includes such files.

Figure 2:
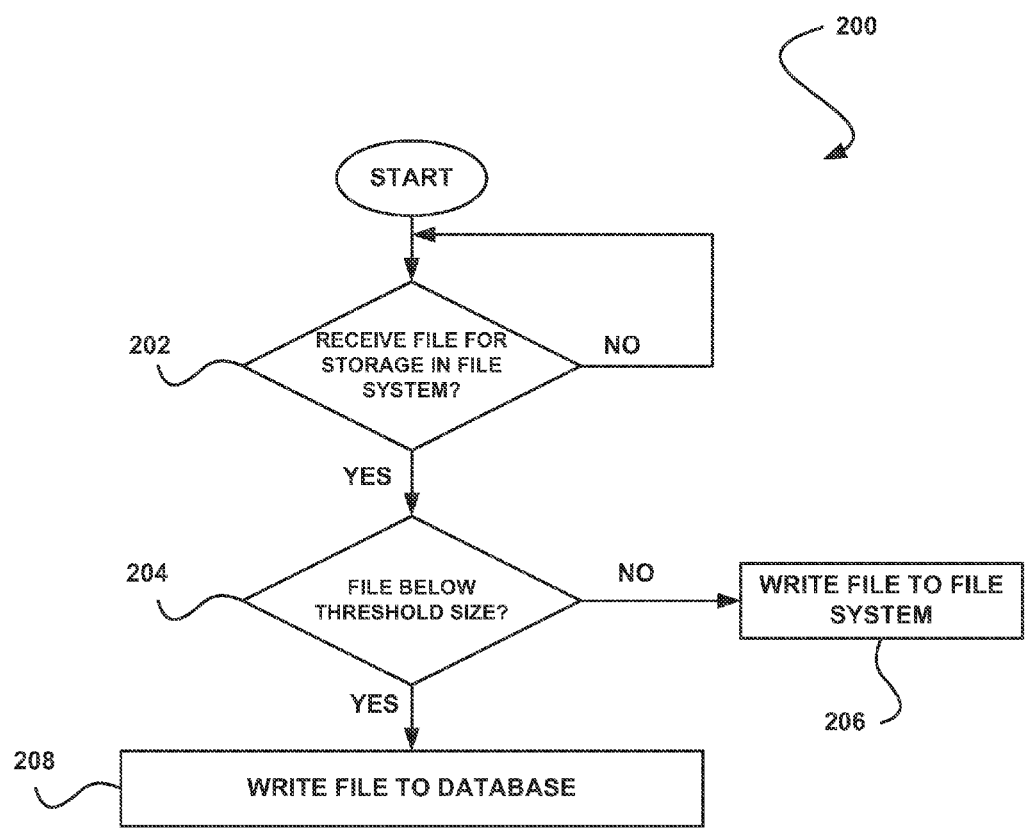
FIG. 2 illustrates a method for identifying a location at which to write files based on a threshold size, in accordance with another embodiment.

FIG. 2 illustrates a method 200 for identifying a location at which to write files based on a threshold size, in accordance with another embodiment. As an option, the present method 200 may be carried out in the context of the functionality of FIG. 1. Of course, however, the method 200 may be carried out in any desired environment. The aforementioned definitions may apply during the present description.

As shown in decision 202, it is determined whether a file is received for storage in a file system. Thus, the determination may include determining whether a request to write a file to the file system of the multi-tenant on-demand database system has been received. Optionally, such file may be received from a tenant of the multi-tenant on-demand database system.

If it is determined that such a file has not been received, the method 200 continues to wait for a file to be received. In response to a determination that a file has been received, it is further determined whether the file is below a threshold size. Note decision 204. The threshold size may include any preconfigured size. Just by way of example, the threshold size may include 32 kilobyte (KB), a page size, or other standard database read size, etc.

It should be noted that as another option, it may be determined whether the file is between a first threshold size (e.g. 1 KB) and second threshold size (e.g. 3 KB). Thus, operation 204 may include, in one exemplary embodiment, determining whether the file is within a preconfigured size range.

If it is determined that the file is not below the threshold size, the file is written to the file system, as shown in operation 206. In this way, a file that is equal to or above the threshold size and which is received for storage in a file system may be directly written to the file system. In the aforementioned exemplary embodiment where it is determined in operation 204 whether the file is within the preconfigured size range, the file may be written to the file system if the file is above (i.e. larger than) the sizes included in the preconfigured size range (e.g. to maximize disk storage and minimize read accesses).

If it is determined that the file is below the threshold size, the file may be written to a database separate from the file system, as shown in operation 208. Thus, a file that is below the threshold size which is received for storage in a file system may be prevented from being directly stored in the file system. In the aforementioned exemplary embodiment where it is determined in operation 204 whether the file is within the preconfigured size range, the file may be written to the database if the file is within the preconfigured size range or below (i.e. smaller than) the sizes included in the preconfigured size range.

Figure 3:
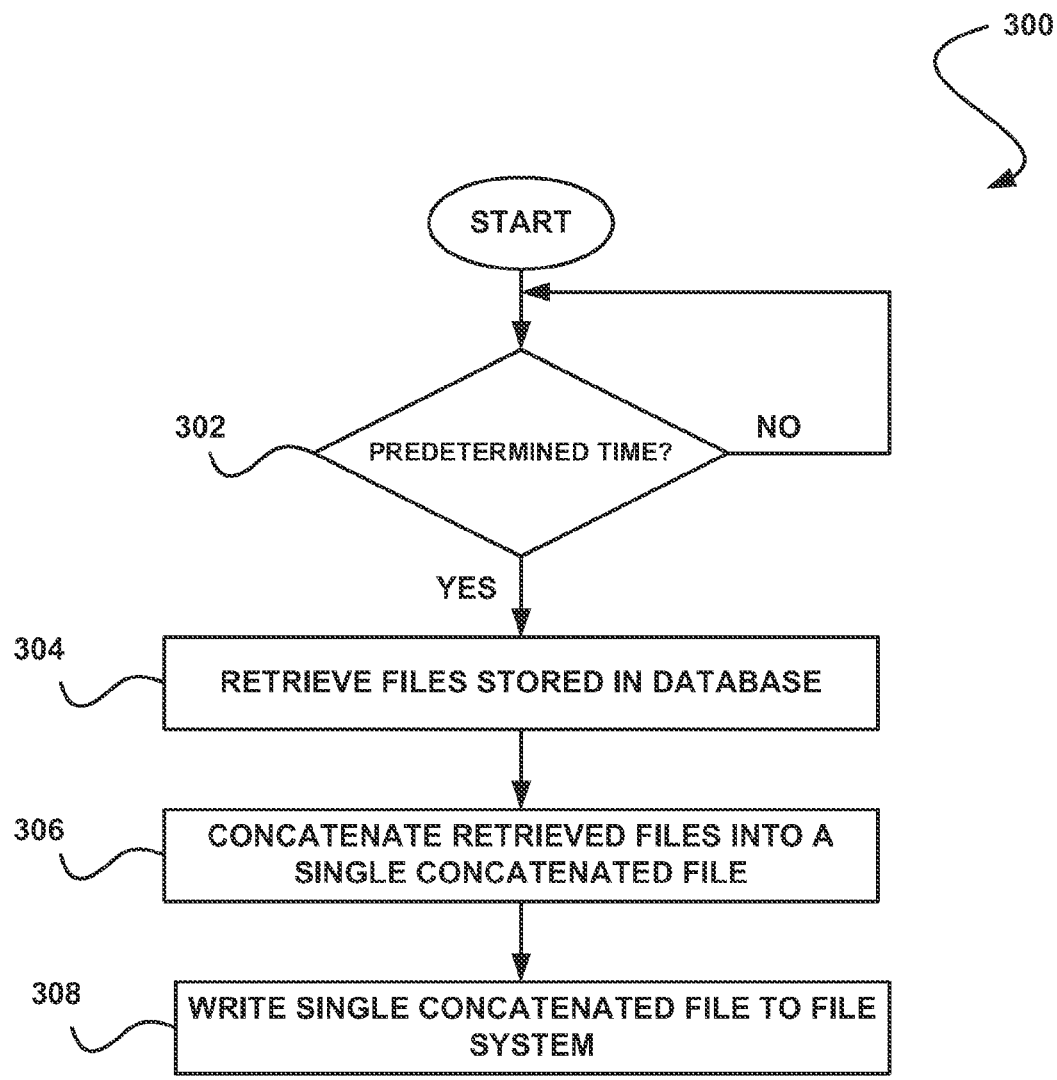
FIG. 3 illustrates a method for concatenating files for storage in a file system, in accordance with yet another embodiment.

FIG. 3 illustrates a method 300 for concatenating files for storage in a file system, in accordance with yet another embodiment. As an option, the present method 300 may be carried out in the context of the functionality of FIGS. 1-2. Of course, however, the method 300 may be carried out in any desired environment. Again, the aforementioned definitions may apply during the present description.

As shown in decision 302, it is determined whether it is a predetermined time. Such predetermined time may include any particular time of day, etc. which is preconfigured. In this way, the present method 300 may optionally only be performed periodically (i.e. at the predetermined time).

If it is determined that the predetermined time has not occurred, the method 300 continues to wait for the predetermined time to occur. Once it is determined that the predetermined time has occurred, files stored in a database are retrieved. Note operation 304. Such database may include the database described above with respect to FIG. 2, in which files of less than a threshold size are stored. To this end, only files of less than the threshold size may be retrieved from the database.

As an option, the retrieved files may include files that are only associated with a single tenant of a multi-tenant on-demand database system that includes the database. Thus, the retrieved files may not necessarily span multiple tenants of the multi-tenant on-demand database system. In one exemplary embodiment, the database from which the files are retrieved may be dedicated to one of the tenants in the multi-tenant on-demand database system, such that only files associated with (e.g. created by, maintained by, utilized by, etc.) the tenant may be stored in the database. As yet another option, the retrieved files may only be retrieved from a single database of the multi-tenant on-demand database service.

As another option, the retrieved files may include a predetermined number of files (e.g. 100 files, etc.). For example, while not shown, the files may optionally only be retrieved if it is determined that at least the predetermined number of files is stored in the database. Thus, if the database stores less than the predetermined number, the method 300 may terminate. However, if the database stores more than the predetermined number, only the predetermined number of files may be retrieved from the database (i.e. with the remaining files maintained in the database for optional retrieval during a subsequent execution of the method 300).

Furthermore, as shown in operation 306, the retrieved files are concatenated into a single concatenated file. Thus, the single concatenated file may store the content of each of the retrieved files. Of course, the single concatenated file may also store any other data associated with the content of each of the retrieved files (e.g. based on a predetermined format, etc.).

Still yet, the single concatenated file is written to a file system. Note operation 308. Such file system may include the file system described above with respect FIG. 2, in which files above the threshold size are stored. In this way, the file system may optionally only store files above the threshold size, including the single concatenated files and any other concatenated files generated utilizing the method 300 described above.

It should be noted that the files retrieved in operation 304 and the single concatenated file may be further managed in any desired manner. In one embodiment, the retrieved files may be deleted upon storage of the single concatenated file in the file system, or otherwise upon retrieval thereof for inclusion in the single concatenated file. Further, upon deletion of the retrieved files, a reference (e.g. pointer) to each of the files in the single concatenated file may be stored in the database. In this way, upon receipt of a request to access one of the files included in the single concatenated file, the reference may identify the single concatenated file and optionally an offset thereof for use in accessing the file.

In another embodiment, in response to a request (e.g. from a tenant, etc.) to delete one of the files included in a concatenated file, the file may be prevented from being removed from the concatenated file. However, as an option, a counter stored in the database for the single concatenated file (e.g. which counts a number of files included in the single concatenated file, and is optionally generated upon creation of the single concatenated file) may be decremented to reflect that the single concatenated file is utilized for storing one less accessible file. Furthermore, an entry of the database storing information describing (e.g. utilized for tracking) the single concatenated file may be updated to indicate which of the files (e.g. which offset, etc.) included in the single concatenated file has been requested to be deleted (e.g. and is no longer available for use).

In yet another embodiment, a periodic process may inspect the single concatenated file stored in the file system by retrieving information associated therewith that is stored in the database. For example, the counter stored in the database for the single concatenated file may be read for determining whether the count identified by the counter is below a threshold count. If it is determined that the count is below the threshold count, additional files may be retrieved from the database and concatenated with the single concatenated file (i.e. concatenated with the files already included in the single concatenated file, such that the single concatenated file subsequently includes the predetermined number of files described above). As another option, if it is determined that the count is below the threshold count, the single concatenated file may be concatenated with another single concatenated file having a count below the threshold count.

Just by way of example, in response to receipt of a request to delete one of the files which has been included in the single concatenated file, a flag may be stored in an entry of the database associated with the one of the files (e.g. for indicating the requested deletion of the file). Periodically, it may be determined whether flagged files included in the single concatenated file are of at least a predetermined size (e.g. or whether there are least a predetermined number of the flagged files included in the single concatenated file). In response to a determination that the flagged files included in the single concatenated file are of at least the predetermined size, the single concatenated file may be concatenated with another single concatenated file or with at least one other file located in the multi-tenant on-demand database system that is below the threshold size.

In still yet another embodiment, the above described periodic process used to inspect the single concatenated file stored in the file system may read the counter stored in the database for the single concatenated file for determining whether the count identified by the counter is zero (e.g. indicating that all files included in the single concatenated file have been requested to be deleted). If it is determined that the count is zero, the single concatenated file may be deleted. Optionally, a query may be run in the database to verify that there are not any existing references to the single concatenated file, prior to allowing the deleting of the single concatenated file.

Optionally, if a request to update (e.g. write to, modify, etc.) a file existing in the single concatenated file is received, the file may be read from the single concatenated file. The file existing in the single concatenated file may be handled in the same manner as if a request to delete the file were received (e.g. by flagging the entry of the database associated with the file, etc.). Further, the read file may be updated as requested and stored according to the method 200 of FIG. 2 and the method 300 of FIG. 3, such that the updated file may be directly stored in the file system or optionally subsequently included in another single concatenated file for storage in the file system.

Figure 4:
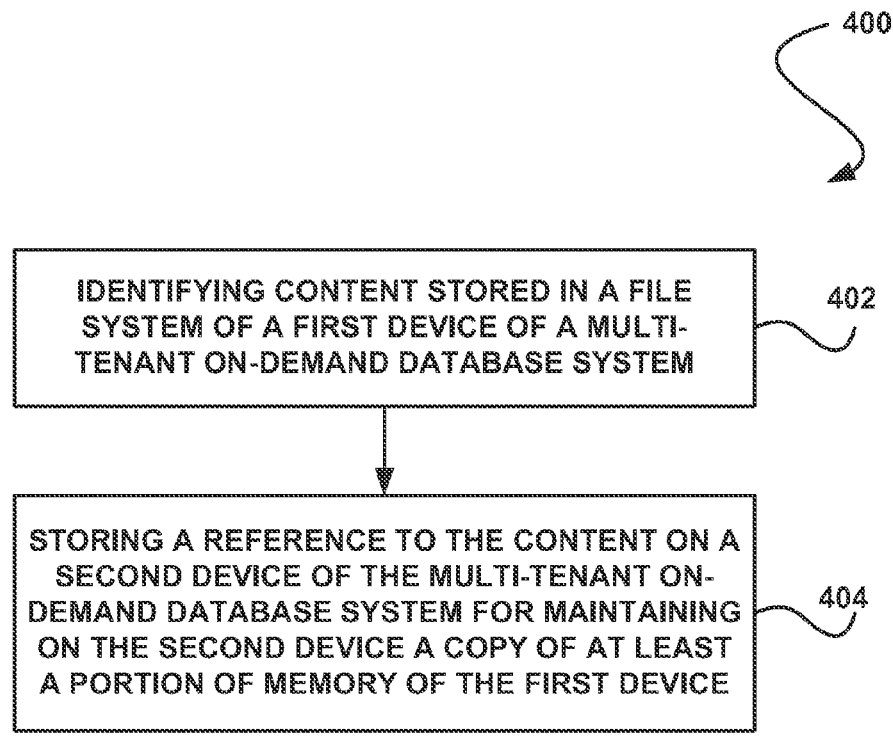
FIG. 4 illustrates a method for maintaining a copy of memory of a first device on a second device utilizing content references, in accordance with one embodiment.

FIG. 4 illustrates a method for maintaining a copy of memory of a first device on a second device utilizing content references, in accordance with one embodiment. As shown in operation 402, content stored in a the system of a first device of a multi-tenant on-demand database system is identified. With respect to the present description, the content includes any type of data capable of being stored in a file system of a device of the multi-tenant on-demand database system. For example, in various embodiments, the content may include a file (e.g. text file, an image file, a video file, an executable file, etc.) of the file system.

In addition, the first device on which the content is stored may include any server or other device of the multi-tenant on-demand database system that has a file system thereon for storing the content. In one embodiment, the first device may include an application server of the multi-tenant on-demand database system, which stores content created, maintained, managed, etc. by at least one tenant of the multi-tenant on-demand database system. In another embodiment, the first device may include a source device, as described in more detail below.

As an option, the content may be identified in response to a request to create a copy of at least a portion of memory of the first device (e.g. by the aforementioned tenant of the multi-tenant on-demand database system). For example, such portion of memory may include that which includes the file system or the portion thereof storing the content. The copy may be requested for creating a sandbox organization in which changes, applications, etc. may be tested, in one exemplary embodiment. With respect to the present description, the sandbox organization may include any other tenant organization (e.g. separate from the first device), which may optionally be on another database of the multi-tenant on-demand database system.

Further, as shown in operation 404, a reference to the content is stored on a second device of the multi-tenant on-demand database system for maintaining on the second device a copy of at least a portion of memory of the first device. It should be noted that the second device may include any server or other device of the multi-tenant on-demand database system which is separate from the first device and which is capable of storing a reference to the content identified from the first device. For example, the second device may be in communication with the first device (e.g. via a network) for identifying the content such that the reference thereto may be stored.

As noted above, the reference to the content is stored on the second device such that a copy of the memory (or portion thereof) of the first device is maintained (e.g. created, etc.) on the second device. Thus, the second device may include a copy of the first (e.g. source) device. In one exemplary embodiment, the second device may include a sandbox organization copy of the memory (or portion thereof) of the first device. For example, the sandbox organization copy may be utilized for testing changes, execution of applications, etc. prior to application thereof to the memory of the first device.

As also noted above, the content may include a file in the file system of the first device. Further, the reference may include a pointer to the file. Of course, however, the reference may include any information capable of being utilized to reference (e.g. locate, etc.) the content.

In one embodiment, the reference may be stored in a database located on the second device. For example, the database may be utilized for tracking files capable of being utilized by the second device and stored on the first device. As an option, a tenant identifier of the first device storing the content may also be stored with the reference, such that the first device on which the content is stored may be identifiable by the second device for use in accessing the file. By storing the reference to the content on the second device, the second device may maintain a copy of the memory (or portion thereof) without storing the content itself, thus reducing the memory utilized by the second device, reducing resource consumption associated with transferring a copy of the content from the first device to the second device, etc.

It should be noted that while only a single second device is described above, the reference to the content may be stored on multiple different second devices, each maintaining a copy of the memory (or portion thereof) of the first device. For example, each of the second devices may include a separate sandbox organization copy of the first device (e.g. for use with respect to different types of testing, etc.). It should also be noted that while only a single piece of content is described above, the second device may store references to any content stored in a file system of the first device such that a copy of the memory (or portion thereof) of the first device may be maintained by the second device.

Moreover, due to the reference to the content stored on the second device, deletion of the content at the first device may be handled according to predefined rules, as described in more detail below with respect to FIGS. 5-8.

Figure 5:
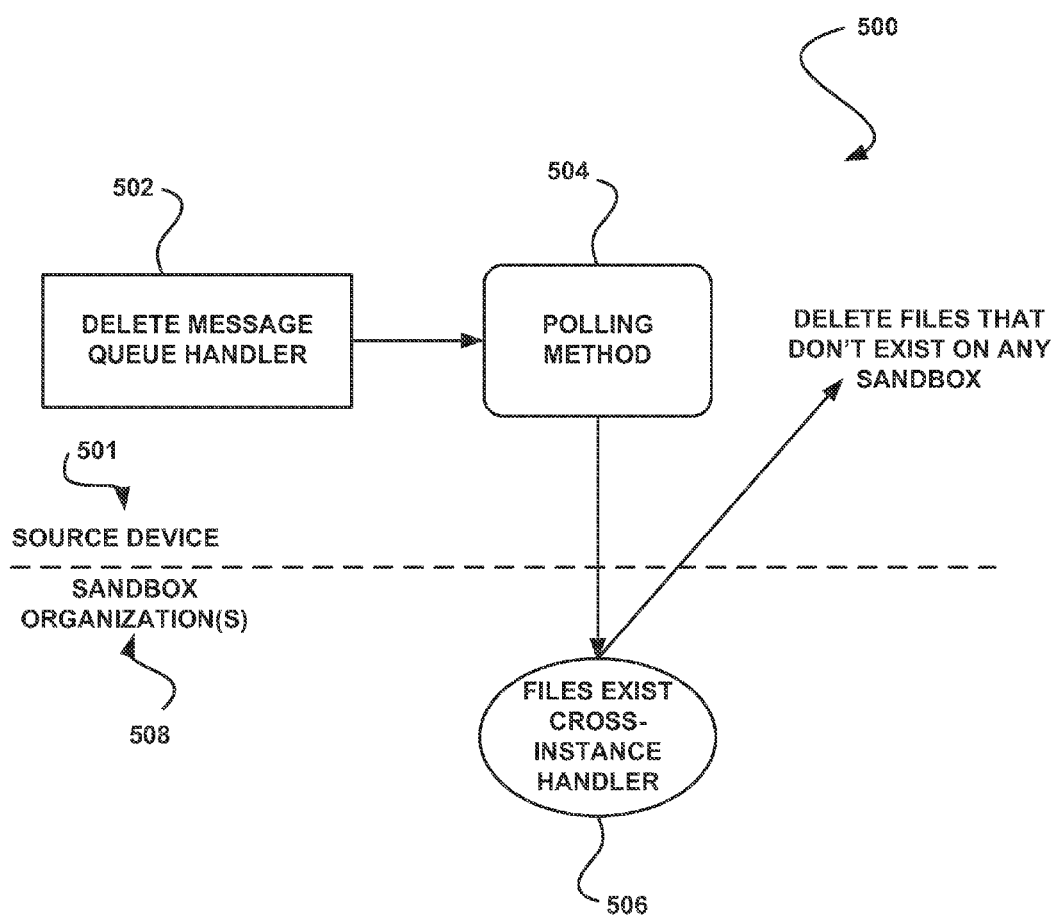
FIG. 5 illustrates a system for deleting a file stored on a source device based on a reference to the file on at least one sandbox device, in accordance with another embodiment.

FIG. 5 illustrates a system 500 for deleting a file stored on a source device based on a reference to the file on at least one sandbox device, in accordance with another embodiment. As an option, the present system 500 may be implemented in the context of the functionality of FIG. 4. Of course, however, the system 500 may be implemented in any desired environment. Again, the aforementioned definitions may apply during the present description.

As shown, a source device 501 and at least one sandbox device 508 (e.g. sandbox organization as shown) are in communication (e.g. via a network, etc.). Thus, while a single sandbox device 508 is described below, it should be noted that the system 500 may be implemented with any number of different sandbox devices 508. Further, the source device 501 may be capable of identifying the sandbox devices 508 by keeping track of the existent sandbox devices 508 in a database at the source device 501.

With respect to the present embodiment, the source device 501 stores a file in a file system of the source device 501, and the sandbox device 508 stores a reference to such file for maintaining a copy of at least a portion of memory of the source device 501. Also with respect to the present embodiment, the file on the source device 501 is attempted to be deleted (e.g. as a result of a request from a tenant of a multi-tenant on-demand database system, etc.). In response to the attempt, the source device 501 communicates with the sandbox device 508, as described below.

Initially, a delete message queue handler 502 of the source device 501 receives a request to delete a file stored in a file system of the source device 501. The delete message queue handler 502 may include any queue (e.g. of a queued message system) capable of being utilized for queuing requests to delete content stored in the file system of the source device 501. For example, the delete message queue handler 502 may be provided by Oracle® Advanced Queuing.

In response to the receipt of the request, the delete message queue handler 502 queues the request, and subsequently initiates execution of a polling method 504 of the source device 501. The polling method 504 may include any executable method capable of being utilized to determine whether the sandbox 508 stores a reference to the file requested to be deleted. For example, the polling method 504 may include a Java® method or other code for requesting from the sandbox device 508 an indication of whether the sandbox device 508 stores the reference to the file requested to be deleted.

As shown, a cross-instance handler 506 of the sandbox device 508 receives communication from the polling method 504 (i.e. the aforementioned request for the indication of whether the sandbox device 508 stores the reference to the file requested to be deleted), and responds to such communication. Thus, the cross-instance handler 506 may determine whether the reference is stored by the sandbox device 508, and may respond accordingly. It should be noted that the cross-instance handler 506 may include any code or process capable of being utilized to respond to communications from the polling method 504 of the source device 501.

As further shown, the source device 501 deletes the file if the response received from the cross-instance handler 506 indicates that the reference to the file is not stored on the sandbox device 508. In another embodiment, the source device 501 may be prevented from deleting the file if the response received from the cross-instance handler 506 indicates that the reference to the is stored on the sandbox device 508. In this way, the source device 501 may only be allowed to delete files for which no reference exists on the sandbox device 508 (e.g. to prevent the sandbox device 508 from referencing a non-existent file of the source device 501).

As an option, the source device 501 may instruct the sandbox device 508 to store a local copy of the file requested to be deleted, if the response received from the cross-instance handler 506 indicates that the reference to the file is stored on the sandbox device 508. In this way, the source device 501 may delete the file upon the sandbox device 508 storing the copy of the file thereon.

It should be noted that where a plurality of sandbox devices 508 exist, each with a potential reference to the file requested to be deleted, the polling method 504 may request from each of the sandbox devices 508 an indication of whether the sandbox devices 508 store the reference to the file requested to be deleted. If any one of the sandbox devices 508 responds that a reference to the file is stored thereon, the source device 501 may be prevented from deleting the file. However, a database entry utilized for tracking the file may be flagged, for indicating that the has been requested to be deleted (the purpose of which will be described below in more detail with respect to the subsequent FIGS. 6-8). As another option, if any of the sandbox devices 508 fails to respond to a request issued by the polling method 504, the polling method 504 may instruct the delete message queue handler 502 to re-queue the request to delete the file (e.g. such that the polling method 504 may again be initiated with respect to the request to delete the file). As yet another option, the source device 501 may instruct only one of the plurality of sandbox devices 508 to store a local copy of the file requested to be deleted, and may further instruct the remaining sandbox devices 508 to reference the local copy stored on the one of the sandbox devices 508.

Figure 6:
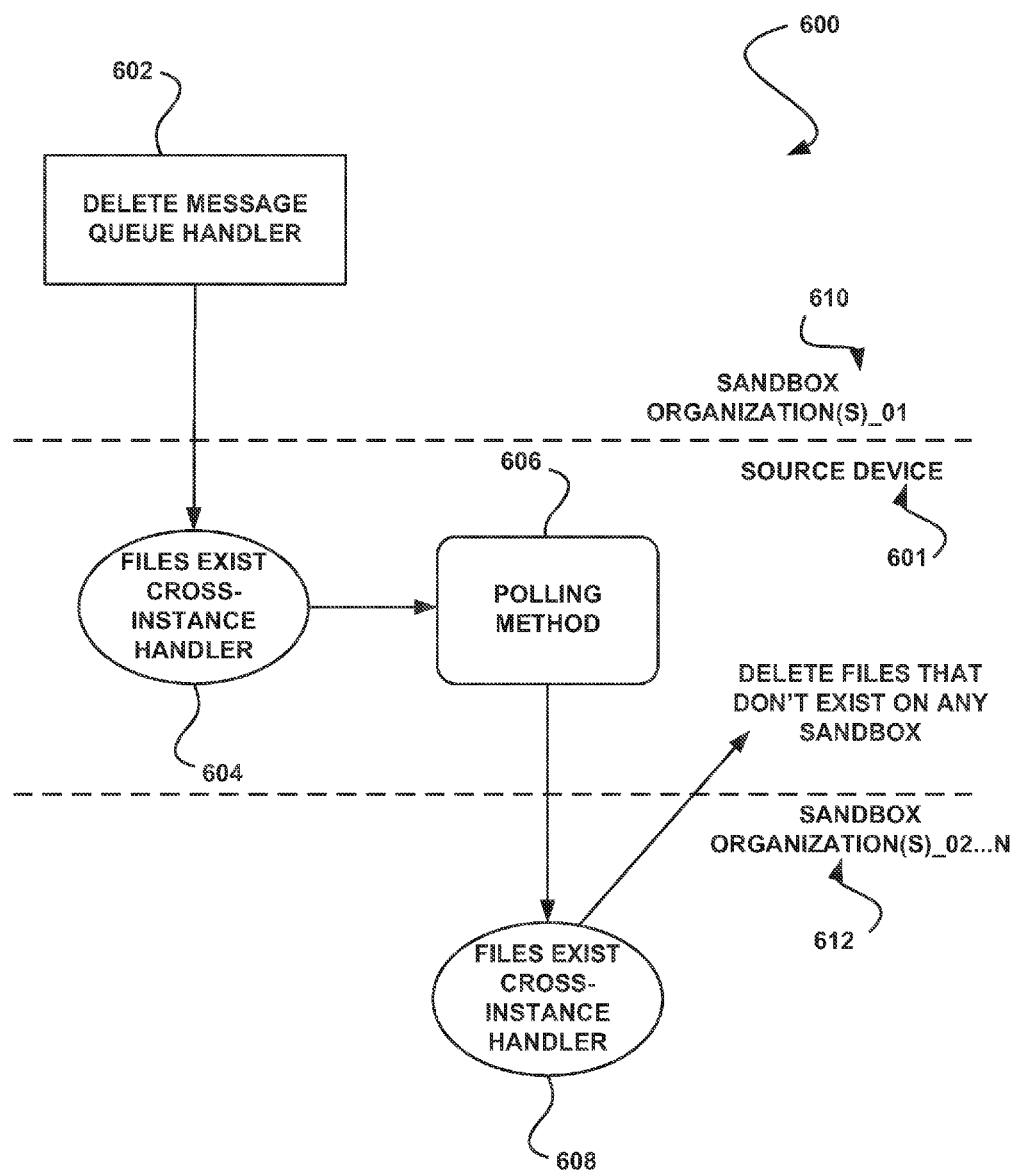
FIG. 6 illustrates a system for deleting a file stored on a source device based on a reference to the file on at least one sandbox device, in response to deletion of the reference to the file on one of the sandbox devices, in accordance with another embodiment.

FIG. 6 illustrates a system 600 for deleting a file stored on a source device based on a reference to the file on at least one sandbox device, in response to deletion of the reference to the file on one of the sandbox devices, in accordance with another embodiment. As an option, the system 600 may be implemented in the context of the functionality of FIGS. 4-5. Of course, however, the system 600 may be implemented in any desired environment. Again, the aforementioned definitions may apply during the present description.

As shown, a source device 601 and a plurality of sandbox devices 610-612 (e.g. sandbox organizations as shown) are in communication (e.g. via a network, etc.). With respect to the present embodiment, the source device 601 stores a file in a file system of the source device 501, and at least a first one of the sandbox devices 610 stores a reference to such file for maintaining a copy of at least a portion of memory of the source device 601. Also with respect to the present embodiment, a reference to the file stored on the first one of the sandbox devices 610 is attempted to be deleted (e.g. as a result of a request from a tenant of a multi-tenant on-demand database system, etc.). In response to the attempt, the first sandbox device 610 communicates with the source device 601, which in turn communicates with the remaining sandbox devices 612, as described below.

Initially, a delete message queue handler 602 of the first sandbox device 610 receives a request to delete the reference to the file. In response to the receipt of the request, the reference to the file is deleted. Also in response, the delete message queue handler 602 queues the request, and subsequently communicates the request (or information associated therewith) to a cross-instance handler 604 of the source device 601. The cross-instance handler 604 of the source device 601 responds to the receipt of the request by initiating execution of a polling method 606 of the source device 601. In particular, the polling method 606 requests from each of the other sandbox devices 612 an indication of whether the sandbox devices 612 store the reference to the file.

As shown, a cross-instance handle 608 of each of the other sandbox devices 612 receives communication from the polling method 606 (i.e. the aforementioned request for the indication of whether the sandbox devices 612 store the reference to the file), and responds to such communication. Thus, the cross-instance handler 608 of each of the other sandbox devices 612 may determine whether the reference is stored by any of the other sandbox devices 612, and may respond accordingly.

As further shown, the source device 601 deletes the file if the response received from the cross-instance handler 608 of each of the other sandbox devices 612 indicates that the reference to the file is not stored on any of the other sandbox devices 612. In another embodiment, the source device 601 may be prevented from deleting the file if any of the responses received from the cross-instance handler 608 of each of the other sandbox devices 612 indicates that the reference to the file is stored on at least one of the other sandbox devices 612. In this way, the source device 601 may optionally automatically delete the file stored thereon, based on the request to delete the reference to the file on the first sandbox device 610.

As another option, the source device 601 may only initiate the polling method 606 in response to a determination that a database entry utilized for tracking the file has been flagged (e.g. where such flag indicates that the itself has been requested to be deleted). In one embodiment, the flag may include a reference to the file stored in a database of the source device 601. Thus, where the file has not previously been requested to be deleted and prevented from doing so, the system 600 may avoid polling the other sandbox devices 612. As an option, if any of the other sandbox devices 612 fails to respond to a request issued by the polling method 606, the polling method 606 may instruct a delete message queue handler (not shown) of the source device 601 to enqueue a request to delete the file (e.g. such that the polling method 606 may again be initiated with respect to the request to delete the file).

Figure 7:
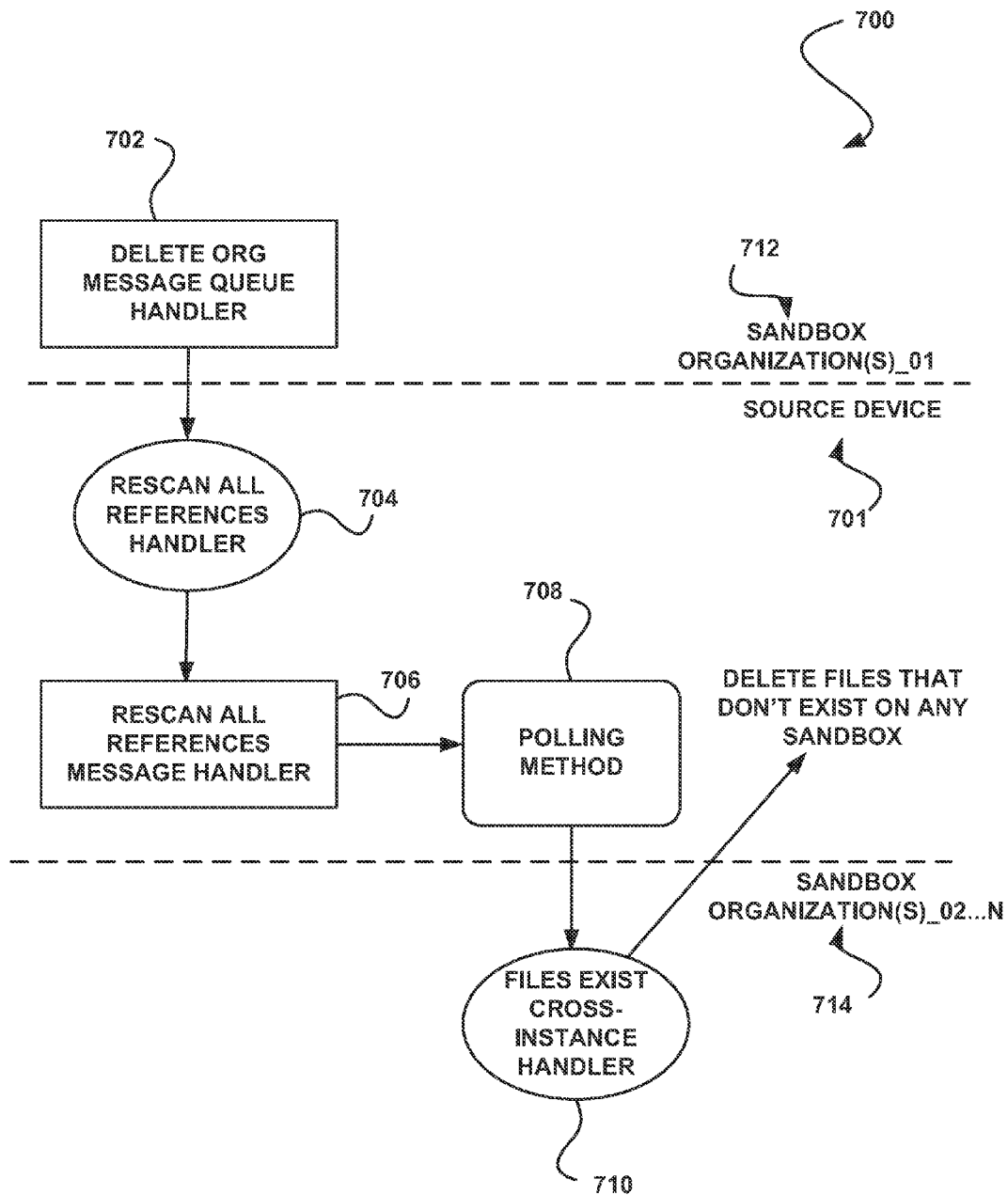
FIG. 7 illustrates a system for deleting a file stored on a source device based on a reference to the file on at least one sandbox device, in response to deletion of one of the sandbox devices, in accordance with another embodiment.

FIG. 7 illustrates a system 700 for deleting a file stored on a source device based on a reference to the file on at least one sandbox device, in response to deletion of one of the sandbox devices, in accordance with another embodiment. As an option, the system 700 may be implemented in the context of the functionality of FIGS. 4-6. Of course, however, the system 700 may be implemented in any desired environment. Again, the aforementioned definitions may apply during the present description.

As shown, a source device 701 and a plurality of sandbox devices 712-714 (e.g. sandbox organizations as shown) are in communication (e.g. via a network, etc.). With respect to the present embodiment, the source device 701 stores a file in a file system of the source device 701, and at least a first one of the sandbox devices 612 stores a reference to such file for maintaining a copy of at least a portion of memory of the source device 701. Also with respect to the present embodiment, an entirety of the contents (e.g. files references) of the first sandbox device 712 is attempted to be deleted (e.g. as a result of a request from a tenant of a multi-tenant on-demand database system, etc.). In response to the attempt, the first sandbox device 712 communicates with the source device 701, which in turn communicates with the remaining sandbox devices 714, as described below.

Initially, a delete message queue handler 702 of the first sandbox device 712 receives a request to delete contents of the first sandbox device 712. In response to the receipt of the request, the contents are deleted. Also in response, the delete message queue handler 702 queues the request, and subsequently communicates the request e.g. a list of contents being deleted) to a cross-instance handler 704 of the source device 701. The cross-instance handler 704 of the source device 701 responds to the receipt of the request by queuing the request in a rescan references message handler 706 of the source device 701. The rescan all references message handler 706, in response to receipt of the request, initiates execution of a polling; method 708 of the source device 701. In particular, the polling method 708 requests from each of the other sandbox devices 714 an indication of whether the sandbox devices 714 store the references to the files being deleted by the first sandbox device 712. Of course, as another option, the polling method 708 may request from each of the other sandbox devices 714 an indication of whether the sandbox devices 714 store the references to the files flagged in a database of the source device 701 (e.g. indicating that the files themselves have been requested to be deleted).

As shown, a cross-instance handler 710 of each of the other sandbox devices 714 receives communication from the polling method 708 (i.e. the aforementioned request for the indication of whether the sandbox devices 714 store the references to the files), and responds to such communication. Thus, the cross-instance handler 710 of each of the other sandbox devices 714 may determine whether the references are stored by any of the other sandbox devices 714, and may respond accordingly.

As further shown, for each of the files for which the reference is being deleted by virtue of the deletion of the contents of the first sandbox device 712, the source device 701 deletes the file if the response received from the cross-instance handler 710 of each of the other sandbox devices 714 indicates that the reference to the file is not stored on any of the other sandbox devices 714. In another embodiment, the source device 701 may be prevented from deleting the file if any of the responses received from the cross-instance handler 710 of each of the other sandbox devices 714 indicates that the reference to the file is stored on at least one of the other sandbox devices 714. In this way, the source device 701 may optionally automatically delete the files stored thereon, based on the request to delete contents of the first sandbox device 712.

As an option, if any of the other sandbox devices 714 fails to respond to a request issued by the polling method 708, the polling method 708 may instruct the rescan all references message handler 706 of the source device 701 to re-queue the request received from the cross-instance handler 704 of the source device 701 (e.g. such that the polling method 708 may again be initiated with respect to the request).

Figure 8:
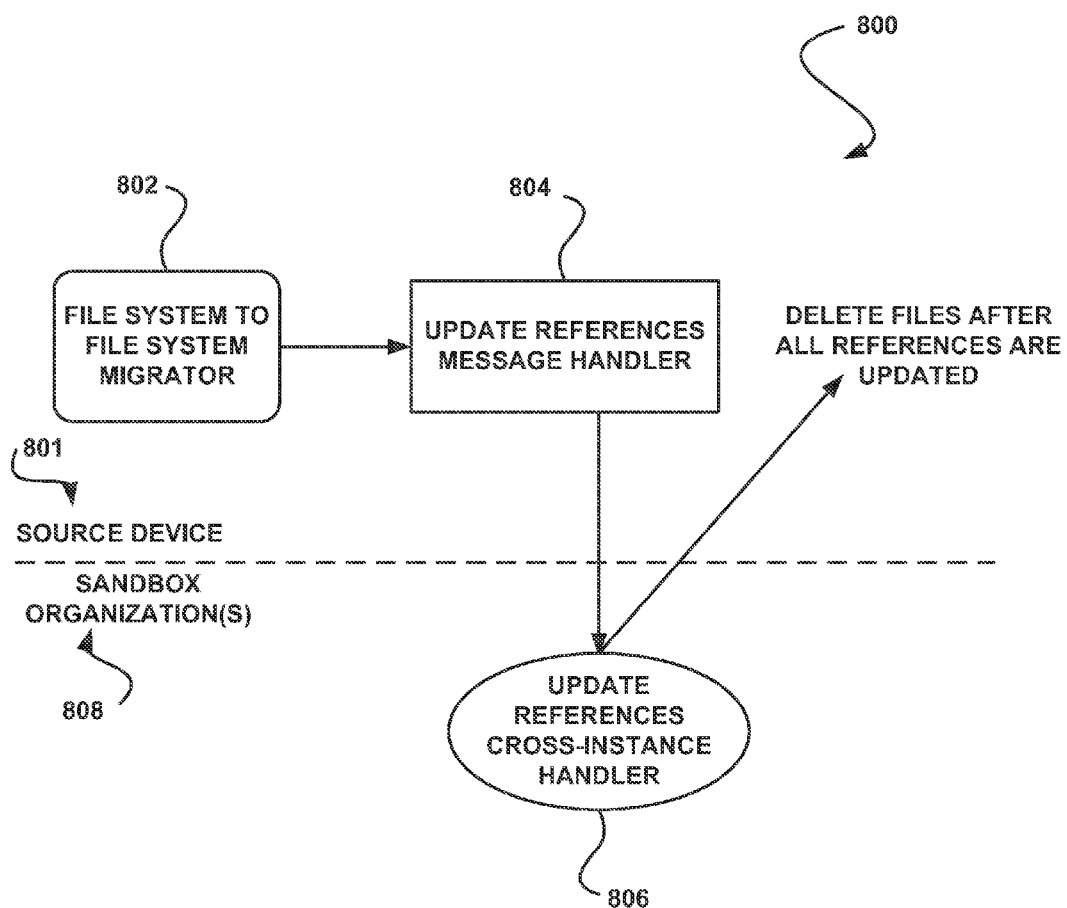
FIG. 8 illustrates a system for deleting a file stored on a source device based on a reference to the file on at least one sandbox device, in response to a request to migrate the file from the source device to another source device, in accordance with still yet another embodiment.

FIG. 8 illustrates a system 800 for deleting a file stored on a source device based on a reference to the file on at least one sandbox device, in response to a request to migrate the file from the source device to another source device, in accordance with still yet another embodiment. As an option, the system 800 may be implemented in the context of the functionality of FIGS. 4-7. Of course, however, the system 800 may be implemented in any desired environment. Again, the aforementioned definitions may apply during the present description.

As shown, a source device 801 and at least one sandbox device 808 (e.g. sandbox organization as shown) are in communication (e.g. via a network, etc.). Thus, while a single sandbox device 808 is described below, it should be noted that the system 800 may be implemented with any number of different sandbox devices 808. With respect to the present embodiment, the source device 801 stores a file in a file system of the source device 801, and the sandbox device 808 stores a reference to such file for maintaining a copy of at least a portion of memory of the source device 801. Also with respect to the present embodiment, the file is attempted to be moved from the source device 801 to another source device (not shown) (e.g. as a result of a request from a tenant of a multi-tenant on-demand database system, etc.). In response to the attempt, the source device 801 communicates with the sandbox device 808, as described below.

Initially, a file system to file system migrator 802 of the source device 801 receives a request to move the file from the source device 801 to the other source device. With respect to the present embodiment, the file system to file system migrator 802 may include any method (e.g. Java® method) receiving a request to move the file from the source device 801 to the other source device. In response, the file system to file system migrator 802 sends the request to an update references message handler 804 of the source device 801, such that the update references message handler 804 may queue the request.

Subsequently, the update references message handler 804 requests from the sandbox device 806 an indication of whether the sandbox device 806 stores the reference to the file requested to be moved. As shown, a cross-instance handler 806 of the sandbox device 808 receives communication from the update references message handler 804 (i.e. the aforementioned request for the indication of whether the sandbox device 508 stores the reference to the file requested to be moved), and responds to such communication. Thus, the cross-instance handler 806 may determine whether the reference is stored by the sandbox device 808, and may respond accordingly.

As further shown, the source device 801 moves the file to the other source device if the response received from the cross-instance handler 806 indicates that the reference to the file is not stored on the sandbox device 808. In another embodiment, if the response received from the cross-instance handler 806 indicates that the reference to the file is stored on the sandbox device 808, the source device 801 may move the file to the other source device and instruct the sandbox device 808 to update its reference to reference the file now stored on the other source device. As an option, if the sandbox device 808 fails to respond to a request issued by the update references message handler 804, the update references message handler 804 may re-queue the request to move the file.

System Overview

Figure 9:
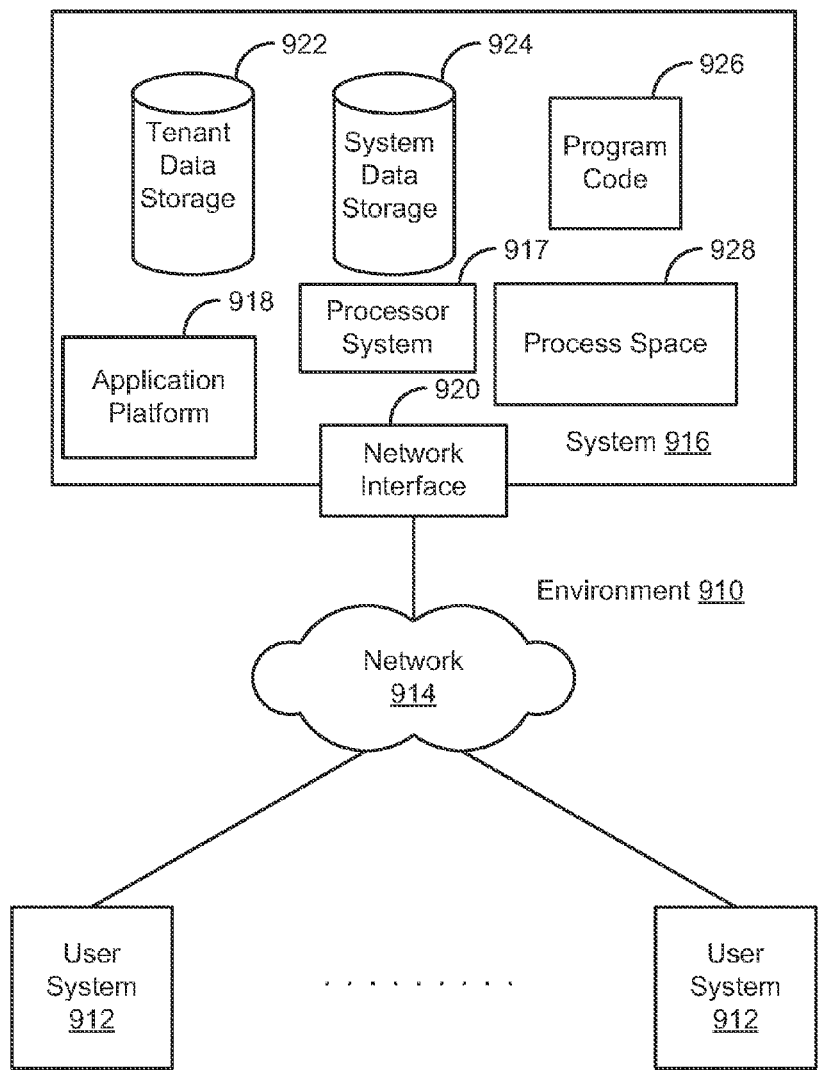
FIG. 9 illustrates a block diagram of an example of an environment wherein an on-demand database service might be used.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928. In other embodiments, environment 10 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, hut instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
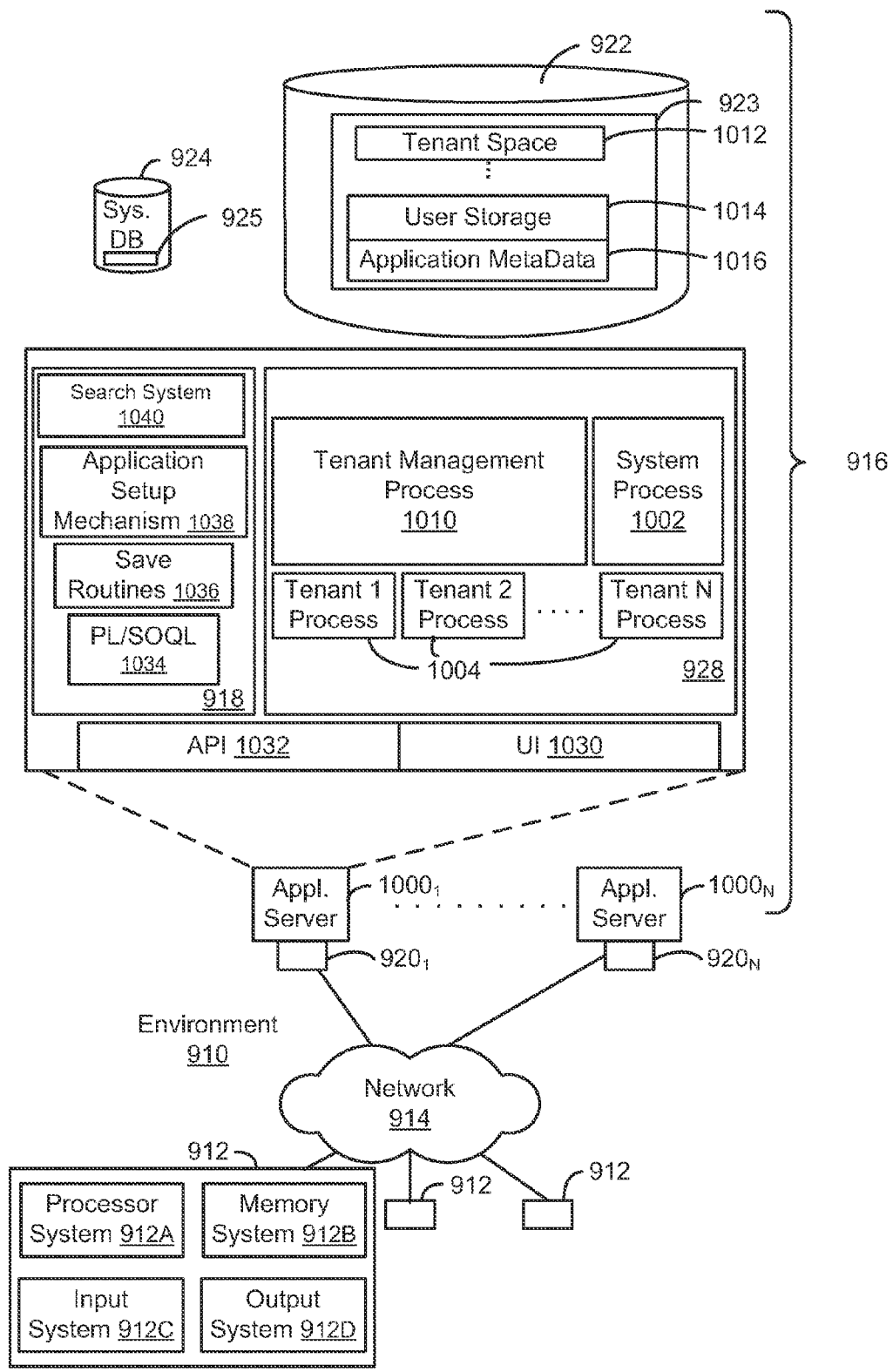
FIG. 10 illustrates a block diagram of an embodiment of elements of FIG. 9 and various possible interconnections between these elements.

FIG. 10 also illustrates environment 910. However, in FIG. 10 elements of system 916 and various interconnections in an embodiment are further illustrated. FIG. 10 shows that user system 912 may include processor system 912A, memory system 91213, input system 912C, and output system 9121). FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 9121) may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as encompass all such modifications and similar arrangements.

The invention claimed is:

1. A computer program product embodied on a non-transitory computer readable medium, comprising:
    computer code for identifying a plurality of files located in an on-demand database system, each of the plurality of files being below a threshold size;
    computer code for concatenating the files to create a single concatenated file;
    computer code for storing the single concatenated file in a file repository associated with the on-demand database system;
    computer code for, in response to storing the single concatenated file in the file repository:
        deleting each of the plurality of files from the on-demand database system;
        storing, for each of the plurality of files, an entry in the on-demand database system, the entry including a pointer to one of the plurality of files, the pointer including a byte offset to a location within the single concatenated file stored in the file repository;
    computer code for receiving, subsequent to storing the single concatenated file in the file repository, a request to delete one of the files from the on-demand system; and
    computer code for setting a delete flag in the entry associated with the one of the files;
    computer code for recalculating whether the flagged files included in the single concatenated the are of at least a predetermined size; and
    computer code for, in response to the recalculation that the flagged files included in the single concatenated file are of at least the predetermined size, merging the single concatenated file with another single concatenated file or at least one other file located in the on-demand database system that is below the threshold size.

2. The computer program product of claim 1, wherein the computer program product is operable such that the files are identified from a database of the multi-tenant on-demand database system that is separate from the file repository.

3. The computer program product of claim 2, wherein the files are stored in the database in response to a determination that each of the files is below the threshold size.

4. The computer program product of claim 1, wherein the computer program product is operable such that the files are identified from the file repository.

5. The computer program product of claim 1, wherein the single concatenated file stores data including each of the files, and for each of the files an indicator of a length of the file and a checksum of the file.

6. A method, comprising:
identifying a plurality of files located in an on-demand database system, each of the plurality of files being below a threshold size;
concatenating the files to create a single concatenated file;
storing the single concatenated file in a file repository associated with the on-demand database system;
in response to storing the single concatenated file in the file repository:
  deleting each of the plurality of files from the on-demand database system;
  storing, for each of the plurality of files, an entry in the on-demand database system, the entry including a pointer to one of the plurality of files, the pointer including a byte offset to a location within the single concatenated file stored in the file repository;
receiving, subsequent to storing the single concatenated file in the file repository, a request to delete one of the files from the on-demand system; and
setting a delete flag in the entry associated with the one of the files;
recalculating whether the flagged files included in the single concatenated file are of at least a predetermined size; and
in response to the recalculation that the flagged files included in the single concatenated file are of at least the predetermined size, merging the single concatenated file with another single concatenated file or at least one other file located in the on-demand database system that is below the threshold size.

7. An apparatus, comprising:
a processor for:
  identifying a plurality of files located in an on-demand database system, each of the plurality of files being below a threshold size;
  concatenating the files to create a single concatenated file;
  storing the single concatenated file in a file repository associated with the on-demand database system;
  in response to storing the single concatenated file in the file repository:
    deleting each of the plurality of files from the on-demand database system;
    storing, for each of the plurality of files, an entry in the on-demand database system, the entry including a pointer to one of the plurality of files, the pointer including a byte offset to a location within the single concatenated file stored in the file repository;
  receiving, subsequent to storing the single concatenated file in the file repository, a request to delete one of the files from the on-demand system; and
  setting a delete flag in the entry associated with the one of the files;
  recalculating whether the flagged files included in the single concatenated file are of at least a predetermined size; and
  in response to the recalculation that the flagged files included in the single concatenated file are of at least the predetermined size, merging the single concatenated file with another single concatenated file or at least one other file located in the on-demand database system that is below the threshold size.

8. A method for transmitting code, comprising:
transmitting code for identifying a plurality of files located in an on-demand database system, each of the plurality of files being below a threshold size;
transmitting code for concatenating the files to create a single concatenated file;
transmitting code for storing the single concatenated file in a file repository associated with the on-demand database system;
transmitting code for, in response to storing the single concatenated file in the file repository:
  deleting each of the plurality of files from the on-demand database system;
  storing, for each of the plurality of files, an entry in the on-demand database system, the entry including a pointer to one of the plurality of files, the pointer including a byte offset to a location within the single concatenated file stored in the file repository;
transmitting code for receiving, subsequent to storing the single concatenated file in the file repository, a request to delete one of the files from the on-demand system; and
transmitting code for setting a delete flag in the entry associated with the one of the files;
transmitting code for recalculating whether the flagged files included in the single concatenated file are of at least a predetermined size; and
transmitting code for, in response to the recalculation that the flagged files included in the single concatenated file are of at least the predetermined size, merging the single concatenated file with another single concatenated file or at least one other file located in the on-demand database system that is below the threshold size.

* * * * *